United States Patent [19]

Stockebrand et al.

[11] 4,071,910

[45] Jan. 31, 1978

[54] TIME-MULTIPLEXED OUTPUT DEVICES IN VIDEO TERMINAL SYSTEMS

[75] Inventors: Thomas C. Stockebrand, Albuquerque, N. Mex.; Russell C. Doane, Framingham; Michael D. Morganstern, Wayland, both of Mass.

[73] Assignee: Digital Equipment Corporation, Maynard, Mass.

[21] Appl. No.: 739,670

[22] Filed: Nov. 8, 1976

Related U.S. Application Data

[63] Continuation of Ser. No. 516,348, Oct. 21, 1974.

[51] Int. Cl.² .................. G06F 3/12; G06F 3/14; G06K 15/00
[52] U.S. Cl. ............................................ 364/900
[58] Field of Search ............................. 364/200, 900

[56] References Cited

U.S. PATENT DOCUMENTS

| | | | |
|---|---|---|---|
| 3,500,336 | 3/1970 | Cuccio et al. | 364/900 |
| 3,501,746 | 3/1970 | Vosbury | 364/900 |
| 3,543,244 | 11/1970 | Cuccio et al. | 364/900 |
| 3,588,838 | 6/1971 | Felcheck | 364/900 |
| 3,602,893 | 8/1971 | Hodges | 364/900 |
| 3,629,848 | 12/1971 | Gibson et al. | 364/200 |
| 3,634,828 | 1/1972 | Myers et al. | 364/200 |
| 3,693,160 | 9/1972 | Swearingen | 364/200 |
| 3,774,158 | 11/1973 | Clark | 364/200 |
| 3,798,610 | 3/1974 | Bliss et al. | 364/200 |
| 3,815,104 | 6/1974 | Goldman | 364/200 |
| 3,828,325 | 8/1974 | Stafford et al. | 364/200 |
| 3,921,148 | 11/1975 | Ophir et al. | 364/900 |
| 3,949,375 | 4/1976 | Ciarlo | 364/200 |

OTHER PUBLICATIONS

UT52 DEC Scope Maintenance Manual, Digital Equipment Corp., Sept. 1976.

*Primary Examiner*—Gareth D. Shaw
*Assistant Examiner*—Jan E. Rhoads
*Attorney, Agent, or Firm*—John M. Gunther; Thomas C. Siekman; Arthur W. Fisher

[57] ABSTRACT

A video terminal system having a plurality of distinct output devices providing humanly perceivable, alphanumeric information is disclosed. The video terminal processes and transfers the binary representations of each alphanumeric character to a character generator. A dot matrix corresponding to the character is provided by the character generator and is time-multiplexed so as to be time-shared by each of the output devices without the requirement for specialized circuitry and with minimal time degradation. The distinct output devices may be video displays and hard copy printers which display alphanumeric characters for a complete line, the video display devices receiving each complete line of characters in a predetermined time period and the printer devices receiving a slice of each character for a line upon request.

5 Claims, 3 Drawing Figures

FIG. 3

| COLUMNS → | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 0 | FRAME COUNT | BELL | | | | | | | | | | | | | OUT | IN | | CURSOR X |
| 1 | TOP LINE | P-SCAN | VIDEO LINE | | | | EOS LINE | P LINE | | | P-X | SCROLL COUNT | | | A | EOS | SILO | CURSOR Y |
| 2 | AP | PRINT | | LINE COUNT | | | SCREEN LINE | INCOMING CHARACTER | | | P-Y | HOLD SCREEN | | | ID | B | Lf BUFFER | |
| 3 ← ROWS | | | | | | | | | | | | | | | | | | SCAN COUNT |

(SILO ↔ spans columns 4–12 in row 1)

TIME-MULTIPLEXED OUTPUT DEVICES IN VIDEO TERMINAL SYSTEMS

This is a continuation of application Ser. No. 516,348 filed Oct. 21, 1974.

BACKGROUND OF THE INVENTION

1. Field of the Invention

This invention relates to video terminal system, and more particularly, to the processing and transfer of information to unlike output devices which display alphanumeric information.

2. Description of the Prior Art

In processing information to be displayed, a problem display devices must confront is translating the signals (bit patterns) transmitted by the computer into the visual characters recognized by people. Examples of such devices that perform this translation are video display screens and hard copy printers.

Historically, each such device has required its own unique circuitry to translate the computer's signals. In addition to the extra circuitry required, unique signal decoding also means the computer is required to service each output device separately even though in many cases the same information is being transmitted to various devices. This is often time consuming since the information may have to be reformatted and changed in order to allow separate output devices to be utilized.

It has been determined that only a small portion of the information which is transferred to output devices is required as a hard copy. In view of the significant time differential required for printing a hard copy of the information versus the time for displaying the information on a video display screen, it would be advantageous to be able to print only certain lines thus increasing the overall speed and efficiency of the multiple distinct output devices. Moreover, this also saves considerable paper.

OBJECTS OF THE INVENTION

It is, therefore, an object of the present invention to overcome the above cited problems by providing in a video terminal means which enable distinct output devices to share output character signals thus reducing the total circuitry required.

It is another object of the present invention to provide a more efficient and lower cost video terminal.

It is still another object of the present invention to provide a video terminal which utilizes a raster scan output as well as a hard copy output, each of these outputs being time-multiplexed to lessen the overall time required for each output to be displayed.

SUMMARY OF THE INVENTION

The video terminal of the present invention alleviates the above cited problems of the prior art by providing output devices which are time-multiplexed and which utilize the same character signals provided by the video terminal.

In accordance with the invention, the video terminal is controlled by an internal microprogrammed processor. The processor is capable of generating signals for unlike output devices and, in between such generation, testing a plurality of different flags within the system which indicates the present status of the terminal. If a flag has been generated, the microprocessor, during the time period between generation of characters for a display device, services the request by performing a jump to a desired location within its read only memory (ROM).

The microprocessor controls the output to a video screen as well as an output to a hard copy printer device. By time-multiplexing and sharing of circuitry, the microprocessor enables the output signals to be used by two separate and different devices without slowing down presentation of locally stored information by either device. Not only are multiple devices serviced with minimal time degradation, but common circuitry is utilized to generate the output signal for the different output devices.

BRIEF DESCRIPTION OF THE DRAWINGS

Various objects, features and advantages for the video terminal system in accordance with the present invention will be apparent from the following detailed discussion together with the accompanying drawings in which:

FIG. 3: is a schematic diagram showing the scratchpad memory utilized in the present invention.

DETAILED DESCRIPTION OF PREFERRED EMBODIMENT

Figure 1:
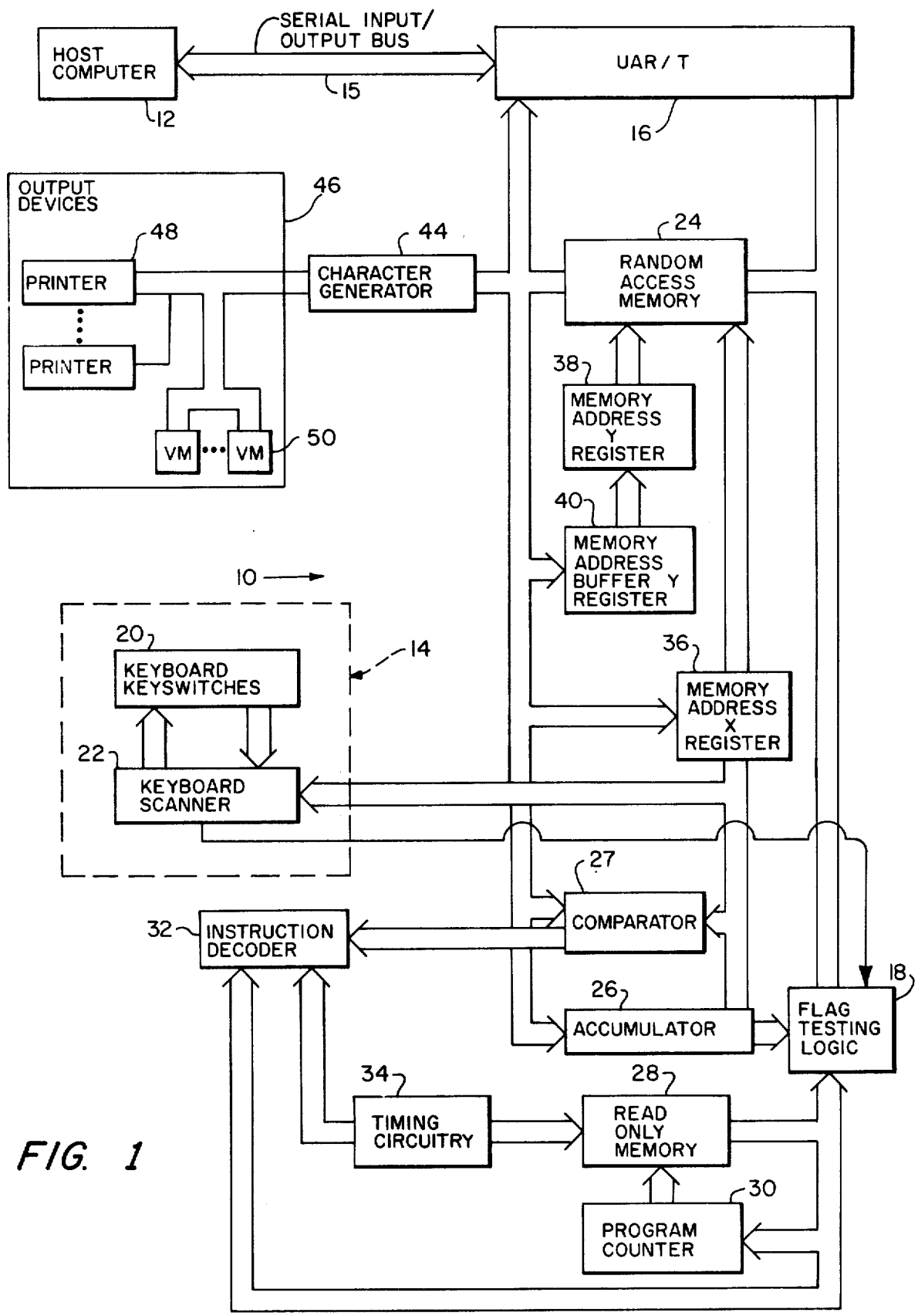
FIG. 1: is a block diagram of the data paths of a video terminal system in accordance with the invention.

Referring now to FIG. 1, there is shown the data paths for transfer of information within video terminal 10 in accordance with the present invention. As shown in FIG. 1, video terminal 10 may receive information from a host computer 12 or from a keyboard data input 14. The host computer may be an independent processor which transfers and/or processes information which may be necessary to be displayed on the output devices of a video terminal 10.

The host computer 12 transmits or receives information via a bus 15 to a universal asynchronous receiver/transmitter (UAR/T) 16. UAR/T 16 provides the means by which data is received from and transferred to the host computer 12. Thus UAR/T 16 temporarily stores incoming characters from the host computer 12 and serves as a depository for outgoing characters.

As each character is provided to UAR/T 16 from host computer 12, a request flag signal is provided to flag testing logic 18. Flag testing logic 18 may be a multiplexer which tests at least 16 flags. However, not all of the flags provided in the terminal 10 are needed for proper understanding of the invention; and hence, only those pertaining to the present invention are disclosed.

After a request flag signal is provided to flag testing logic 18, the flag is tested by and identified through the microprocessor of the video terminal 10 and indicates that information, i.e. a character, is available. In response thereto, the microprocessor performs a jump to that part of its program which processes incoming characters. This program enables the transfer of the character into the video terminal's memory.

The video terminal 10 is also capable of operating in a local mode such that it receives characters from a keyboard data input 14. The operation of receiving a character from the keyboard 14 is similar to the operation of receiving a character from UAR/T 16. When a keyswitch 20 is depressed, a request flag signal is provided to flag testing logic 18. In response thereto, a keyboard scanner 22 may be used by the microprocessor to test the state of any keyswitch 20. The microprocessor accomplishes this by addressing each keyswitch. Since the time required for depressing a keyswitch is much greater than the time required by the microprocessor to perform the addressing, the microprocessor identifies the depressed key. Each key on keyswitch 20 has a code in a table stored in the microprocessor's read only memory (ROM) 28. In response to the depressed keyswitch 20, the code corresponding to the depressed keyswitch is transferred into an accumulator 26 from which it is then transferred into the video terminal's memory.

Both the UAR/T 16 and keyboard 14 represent the two sources of data into the video terminal 10 and both operate independently of the microprocessor. Each generates a flag as is well known in the art to the flag testing logic solely as a function of receiving a character. For example, the UAR/T 16 automatically accepts a character from the host computer 12, the characters capable of being transmitted either individually or in a burst mode. Upon receipt, the UAR/T 16 generates the request signal to logic 18 while changing the data from the host computer from serial to parallel form. In response to the flag, the microprocessor will store the data into the video terminal's memory for subsequent operations.

In either of the above situations, if the information generated either from the UAR/T 16 or from the keyboard 14, cannot be immediately transferred into a memory location from which the character may be immediately displayed, then there are several temporary storage locations in the memory which are used to store these incoming characters. At a subsequent time, the microprocessor will then transfer the information located in the temporary storage location into a proper displayable memory location.

The memory of video terminal 10 is a random access memory (RAM) 24. The size and content of RAM 24 may be of any well-known configuration, however, for purposes of description, the following preferred figures are used. RAM 24 stores 1024 words, each word including seven bits. RAM 24 has a refresh buffer which includes 960 words. These words comprise the information which is displayed on the multiple distinct output devices. For example, a video display device may be coupled to the video terminal 10, the video display device comprising 12 lines of 80 characters each. Each of the 960 words in the refresh buffer would correspond to one of the locations to be shown on the video display device. Obviously, if the video display device had a different configuration, the size of the RAM would be correspondingly changed.

In addition to the refresh buffer, RAM 24 has memory locations shown in FIG. 3. Forty-eight of these locations are used as a scratchpad memory to store operational information for the video terminal. This information may be internal status indications which identify the present state of the terminal. RAM 24 also includes a silo, Column 0 of FIG. 3, comprising 16 locations for temporarily storing characters which were unable to be immediately stored in the refresh buffer. This would occur, for example, when the UAR/T 16 receives a significant number of characters and each is unable to be serviced immediately since other operations are being performed by the microprocessor. In accordance with the program in the ROM, these characters will eventually be transferred into the refresh buffer.

As shown in FIG. 3, the internal status indicators in the memory 24 include information for servicing a hard copy printer device and a video display device. For example, Column 3, Row 1 identifies the need for the printer to display information. In accordance with this operation, Column 2, Row 7 has the P line information which identifies the printed line to be displayed, this printed line corresponding to a line presently shown on a video display device. Column 2, Row 1 contains the scan of the current line presently being copied by the printer and Column 1, Row 10, Column 2, Row 10 identify the location of the character in the refresh buffer to be transmitted to the printer device.

In order to identify information about the video display device, top line in Column 2, Row 0 identifies the line in the refresh buffer of RAM 24 which corresponds to the top line displayed by the video display device. These lines may not have a fixed relationship since messages more than 12 lines may be generated; the lines greater than 12 displacing previous lines in the refresh buffer while scrolling is performed on the video display device. Column 3, Row 3 identifies how many lines have been placed on the video display.

Column 1, Row 13 and Column 2 Row 17 identify the location of a cursor which indicates the location of the next character to be provided to the video display device. Screen line in Column 2, Row 6 identifies the line on the display of the cursor. This is the absolute number since scrolling may have occurred.

Many of the other locations contain information which is not important for the purposes of this invention. Some of the other indicators have been shown such as Column 1, Rows 14 and 15 which identify the locations of the characters going into (IN) and from the silo Column 0. Moreover, Column 2, Row 14 and Column 3, Row 15 store the keyboard characters of the depressed keys which may then be transferred either directly into the refresh buffer or into the silo.

Referring back to FIG. 1, the microprocessor also includes ROM 28, a program counter 30 and instruction decode logic 32. ROM 28 stores the processor's microprogram. The program counter 30 points to the ROM location containing the instruction to be executed while the instruction decode logic 32 decodes the contents of the ROM microword that has been addressed by the program counter 30. In response to the contents of program counter 30, ROM 28 generates signals which are decoded by decode logic 32 to provide for the transfer of data in the video terminal 10.

It is recognized that all transfers of data occur at discrete times because of timing circuitry 34. Timing circuitry 34 comprises a basic crystal oscillator which has several distinct counters to divide the output signals of the crystal oscillator. Since the video terminal 10 is a synchronous device, each of the different timing signals control the transfers of characters and data in the video terminal as well as controlling the output to be displayed on the video monitor. In addition, the timing circuitry controls the raster scan of the video display device. An example of timing circuitry 34 used for synchronous processors and which may be applied to the instant invention is found in Small Computer Handbooks 1970, Copyrighted in 1967, 1969 by Digital Equipment Corporation wherein the PDP-8 synchronous machine is disclosed.

Video terminal 10 has a number of storage registers for general use. The previously disclosed accumulator 26 is used by the microprogram as a general register. It can be cleared, incremented and decremented as is well known in the art.

The contents of accumulator 26 may be compared with the current RAM location, with zero, with the current scan number being performed or with the contents of an X register 38. The accumulator may be loaded from the RAM 24 or its contents may be loaded into the RAM 24. For example, if the transfer of data is from the keyboard scanner 22, there is a direct data path into RAM 24 from accumulator 26.

The other storage registers in video terminal 10 are X register 36 and a Y register 38. These registers are used to identify the location of the information in RAM 24 which is to be displayed on the output devices as well as to identify the location of the information in the scratchpad portion of RAM 24. The X and Y registers 36 and 38 may be cleared, incremented, decremented or loaded by microinstructions generated from the ROM 28 as is well known in the art.

The X register stores seven bits which locate a column in RAM 24. The Y register stores four bits which locate a row in RAM 24.

The Y register 38 receives its input from the Y buffer register 40. The purpose of the Y buffer register 40 is to temporarily store the four bits identifying the row location of the upcoming address for the Y register 38. Since there cannot be concurrent sending of the information signals to the X and Y registers, the Y buffer register 40 allows the Y address to be first delivered and then followed by the X address information. The X and Y registers may be loaded to address the location in the RAM 24 to identify the character to be transmitted, displayed or used in further processing.

Once a character for display or printing has been identified, it is transferred from RAM 24 into a character generator 44. The character generator 44 is a read only memory (ROM) which takes an input character and transfers it into a 5×7 dot matrix representation of the alphanumeric character. The character generator 44 may be any one of the well-known read only memories, and in the preferred embodiment is one made by Signetic Corporation under the number 2513. The output of character generator 44, i.e. the dot matrix pattern, is then provided to the distinct output devices of video terminal 10.

More specifically, the output devices 46 of the video terminal 10 are usually of two kinds. One type of output device may be video display devices indicated generally at 50. The video displays may be any raster cathode ray tube terminal as is well known in the art. These devices of the raster scan nature are synchronous.

In addition, another human readable form of information is provided by a printer output device 48. The printer provides a hard copy output and for the present invention may be a rotation helix scanning printer of the facsimile type; a single wire impact printer or a single dot thermal or electrical printer.

The principal requirement of the hard copy printers is that each prints a full line scan by scan. Each scan provides a slice of a character with the first scan providing the top slice for all the characters of the particular line. Once all 80 characters have had their first slice transferred to the printer, then the next scan for each character may begin. This continues until the entire dot matrix for the line has been transferred to the printer.

The video display 50 and the printer 48, as will be subsequently seen in the discussion of FIG. 2, both utilize the output generated by the RAM 24 to display information in human readable form. Both devices thus utilize the same signal generated from the character generator 44.

The video display's raster scan, in the preferred embodiment, requires 256 horizontal scans to complete its display. Each scan includes a complete left to right cycle. This method is quite similar to that being used in commercial television. Thus, the electron beam is scanned vertically across the line and then dropped down one line so that the next horizontal scan occurs.

When the electron beam reaches the bottom of the screen, the beam is deflected back to the beginning of the screen by a flyback operation. The beam does not move to the top of the screen instantaneously but rather requires approximately 16 horizontal scans during the flyback process.

Each line of characters and symbols is painted using nine horizontal scans; since there are 256 scans provided for the entire screen and since 16 horizontal scans are used in the flyback process, this leaves 11 blank horizontal scans in between each line of the characters. These 11 horizontal scans provide for interlinear spacing between the characters and makes the characters distinct in each line. During the interlinear spacing of the lines, the microprocessor performs certain operations in order to test the flags which may have been provided to flag testing logic 18 and to perform the other required operations.

The printer may be utilized to print only one line of those which are appearing upon the video monitor 50. Thus, if a particular line, for example, line 1 is desired to be printed on the printer paper, then suitable indication via the depressing of keyswitch 20 when the cursor is on the desired line is given to microprocessor and during the interlinear spacing the dot patterns of the characters for that line, as will subsequently be explained, are sent to the printer mechanism in order for it to make a hard copy of that line.

By the very nature of having mechanical parts, the printer device can never hope to process and produce individual scans and characters as fast as is able to be provided on the video screen. As a result, the information that can be supplied to the printer is much slower and requires much more elapsed time to accomplish the same results.

For the type of printer devices noted, a rotating helix scanner printer is preferred. The information is transmitted to the printer as follows: As the helix spins, the point of contact with a metal bar is moved from left to right. Between the bar and helix there are inserted removable strips of electrically sensitive paper. Electric current corresponding to the dot pattern of the character is applied to the bar through the paper. As it passes through the paper a dot is created; this dot corresponds to the applied electric charge which corresponds to the dot pattern for the individual line selected. Thus, for example, if a letter T was to be provided as the first letter, the initial information transmitted to the printer would consist of five dots to show the first slice of the first scan for the alphanumeric character T and five electrical charges would have been emitted.

Figure 2:
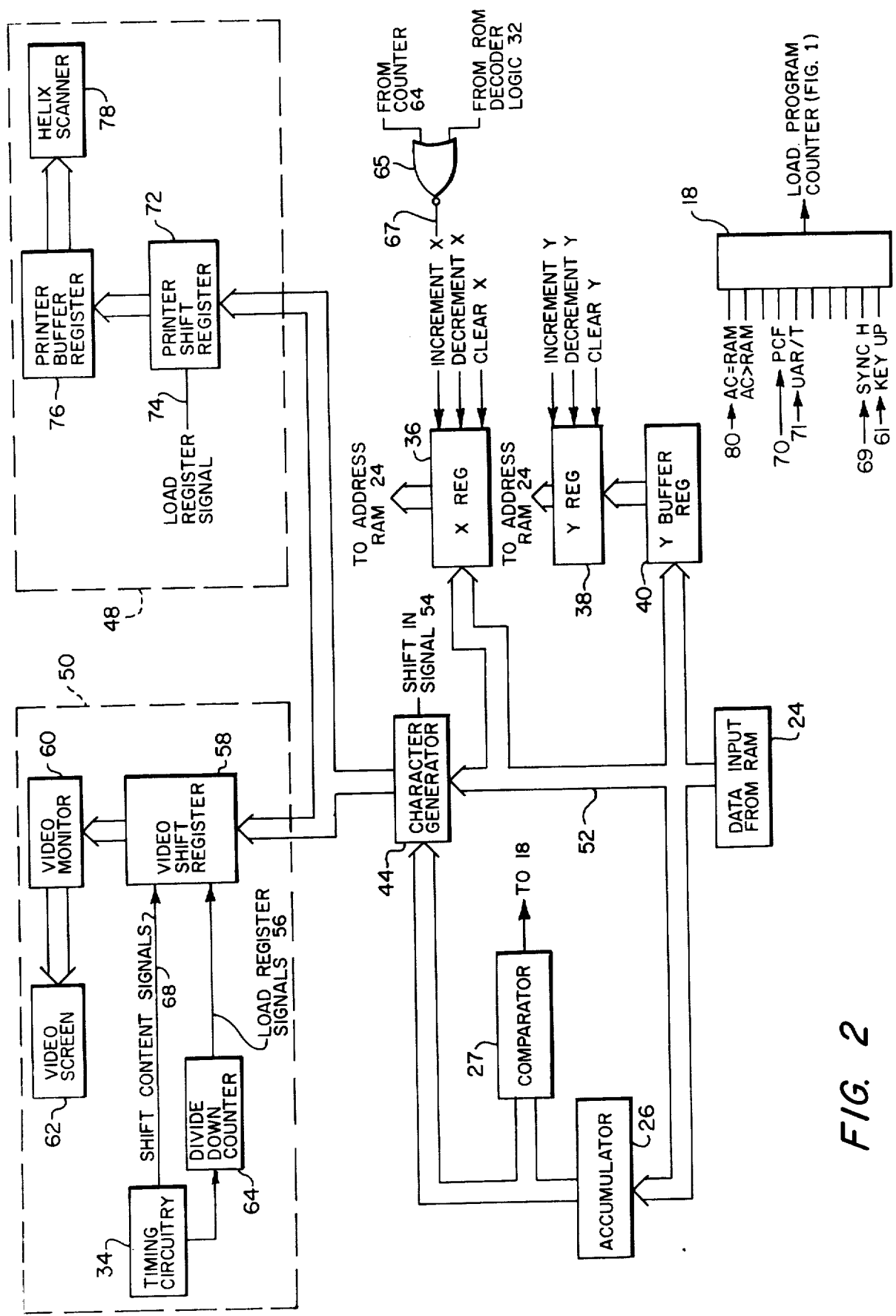
FIG. 2: is a block diagram of common circuitry utilized by the different output devices of the video terminal.

In order to understand the operation of the video terminal 10, FIG. 2 is shown which illustrates the detailed circuitry necessary to understand the apparatus of the present invention. The numerals shown in FIG. 2 correspond to FIG. 1. In the discussion of FIG. 2, it will be assumed that 12 lines are to be painted on the video screen and the first line displayed on the video screen has been selected to be transferred to the rotating helix scanner in order to provide a hard copy output.

In order to describe the operation of the video terminal 10, it is assumed that initially there are no characters on the video screen 62 and the helix scanner 78 printer has been enabled. Since the video terminal is a synchronous device, the basic timing is taken from the video display via the timing circuitry 34. This means that all operations are based on whether or not a line is being displayed and the interlinear spacing between such lines.

After the program counter 30 has been incremented to provide the instruction for presenting alphanumeric characters to the video display 50, one of the fields of the instruction enables a series of microsteps to be executed. The first microstep may provide data to the accumulator 26 from the location in scratchpad memory Row 3, Column 17. This location initially has all zeros, indicating that the first slice is to be displayed. Since character generator 44 provides the alphanumeric characters in a 5×7 matrix, there are seven slices required to display all dots for an individual alphanumeric character for an individual line. The horizontal scan may require up to five dots per slice for the character itself.

After the accumulator 26 has been loaded, the Y buffer register 40 is loaded with data, from Row 2, Column 2, and this indicates the address of the first line in the refresh buffer of RAM 24. Subsequently, the X register is cleared by the microprocessor, thus indicating the first column in the refresh buffer is to be addressed. At this time the information in the Y buffer register 40 is transferred to the Y register 38. This enables the addressing of the 12×80 refresh buffer of RAM 24 in order to provide the first character to be displayed.

In response to the address provided by the X and Y registers, the contents of this location in RAM 24 has its data transferred over bus 52 to a character generator 44. At the next character time as determined by the timing circuitry 34, the character generator translates via its appropriate ROM location the alphanumeric character, which may be in ASCII code, into a dot matrix, i.e. a 5×7 representation of the alphanumeric character. The contents of the accumulator 26 also addresses the character generator and determines the slice of this alphanumeric character to be displayed, i.e. which horizontal line of the dot matrix is to be transferred from the character generator 44.

Thus, in response to the alphanumeric character provided from RAM 24 over bus 52 to character generator 44 and the address from accumulator 26 to character generator 44, the dot pattern for the top slice of the character is generated to video shift register 58. The video shift register 58 is a depository for the current video character slice.

In response to a load signal 56 from timing circuitry 34, the video shift register 58 stores in parallel the output of the character generator 44. Subsequently, a shift contents pulse 68 which is the basic crystal oscillator pulse clocks the information contained within the video shift register 58 serially into a video monitor 60 such that the initial dot pattern which had been placed in the video shift register 58 is displayed on the video screen 62.

The basic timing pulses provided by the crystal oscillator in the timing circuitry 34 also provides for the scanning of screen 62. Since the video display 50 is in synchronization with the circuitry of the video terminal 10, the determination of the starting time for initiating the scan is precisely provided.

Since the time required to provide the next alphanumeric character to the character generator 44 is small when compared to the time that is required for an instruction to be executed, an automatic incrementing of the X register is provided once a line has begun to be displayed. This automatic incrementing is tied to the synchronous operation of the video terminal 10 and results because of timing circuitry 34.

This synchronous operation provided by the timing circuitry 34 may operate as follows. A crystal oscillator (not shown) generates a series of pulses at a predetermined rate, these pulses functioning as the basic timing mechanism for video terminal 10. A counter 64 is coupled to the crystal oscillator and provides one output pulse for every nine pulses provided by the crystal oscillator. This counter 64 is a divide-down counter and is well known in the art. The one-ninth ratio is needed since for each alphanumeric character there may be up to five dots and there is two blanks for each side of the character so as to provide intercharacter spacing. Thus each character is needed after nine pulses from the basic crystal oscillator.

The shift in signal 54 to character generator 44, the load register signal 56 to video shift register 58 and the automatic increment X signal 67 to X register 36 are all provided once every ninth pulse of the crystal oscillator. In order to have these signals synchronized one to the other, there are many ways including the use of delay lines, one-shots, etc. to realize this operation. Since the timing circuitry forms no part of this invention, any method may be utilized.

The ROM video display instruction used to enable the display of information on video display 50 has one input to AND Gate 65 with the other input being a timing signal from the counter 64. The combination of these two signals provides an increment X signal 67 to X register 36 which increments the contents of the X register by one as is well known in the art. When the ROM is used to process other information in the video terminal 10, AND Gate 65 does not provide any automatic incrementing pulses since the ROM signal is not provided.

Once the X register is incremented to identify the next column, the character in the adjacent column from the RAM 24 is transferred into the character generator 44 which translates the alphanumeric character provided at its input into a dot matrix pattern. Since the accumulator 26 has not changed, the first slice of the character is then generated in parallel into video shift register 58 after a load signal 56 has been received. This dot pattern is then shifted serially out of the video shift register by shift signals 68 to the video monitor 60 and then displayed on the video screen 62.

This sequence of operations continues until the end of the 80 characters has been displayed. It should be noted that not every column addressed contains alphanumeric characters. Some locations of the RAM are blank, a blank corresponding to a particular ASCII code. In these situations character generator 44 translates the ASCII character and provides low signals to video shift register 58 such that no painting occurs on video screen 62.

At the end of the 80th character, a sync H signal 69 is generated to the flag testing logic 18. This signal indicates that the end of the line has occurred. Prior to this flag being generated, the microprocessor has been in a loop in which it continuously checks this flag. When the flag is true the program counter 30 is loaded with the next instruction which increments the accumulator register 26, clears the X register 36 and stores the number of the scan in Column 17, Row 3. The electronic beam is returned to the next horizontal scan line to begin its second slice.

After the scanner has returned to its initial position, the character generator 44 receives the same characters as it received in the previous scan. However, this time the accumulator 26 causes the selection of the next slice of each character which is then transferred in parallel to video shift register 58. Again the X register is incremented through the 80 characters comprising the displayable line at which time the scan is completed and the same operations as before occur. This continues until the 9th slice of the line has been painted onto the screen. Even though there are only seven lines which display actual characters, there is one line prior to and one line following the actual characters which are used in the painting of the characters.

When the accumulator 26 reaches the number 9, comparator 27 generates a signal AC = RAM 80 to flag testing logic 18 in order to inform the microprocessor that other operations of the video terminal may be checked. At this time, the microprocessor is then able to perform other operations in response to the request flags set in flag testing logic 18. More specifically, the microprocessor would execute a set of instruction which checks the other occurrences in the video terminal during the time in which the painting of the alphanumeric characters had occurred. These tests would include testing for key-up signals 61 from the keyboard and UAR/T signals 71 from the UAR/T 16 via the host processor 12.

One of these other functions which the microprocessor tests is whether a flag corresponding to a PC signal 70 has been received. This signal indicates that the printer 48 has requested a character. The printer is serviced at least twice while the video display 50 is in between lines, i.e. the spacing in between the displaying of the characters on the screen. These are immediately after a complete line has been displayed and immediately before the next complete line is to be displayed. In addition, it may service the printer request at another additional time depending upon the other information received by terminal 10, i.e. UAR/T 16 transmitting signals which may have been accomplished during the previous time frame.

The delay time from when a character request is made by the printer to when the dot pattern is ready in the printer shift register 72 is restricted by how often the request flags are checked. Theoretically, this flag could be checked every flyback time, i.e. the time after a slice of the line has been completed to the time the next slice is started. However, because of the speed of the printer and the fact that the printer register is double-buffered in the preferred embodiment, it is easily serviced during the interlinear spacing of the video monitor.

In response to a PC flag, the microprocessor executes a jump instruction via the program counter 30 which enables the ROM 28 to identify the locations of the RAM associated with the printer's output. These locations contain current scan count Column 2, Row 2, character count, Row 11, Columns 2 and 3 and line count, Column 2, Row 7 for servicing the next request of the printer. This information is transferred to the X, Y and accumulator registers. The X and Y registers address the locations of the alphanumeric character in the refresh buffer of RAM 24. This character is then transferred to the character generator 44 which provides in parallel the dot pattern output required by the printer 48. This output is then transferred to printer shift register 72. Printer shift register 72 serves as a depository for the current printer character slice.

As was the case for the video display, the dot matrix pattern is provided in parallel to the printer shift register 72 in response to a load signal 74 received by printer shift register 72. Load signal 74 is generated by instruction decode logic 32 in conjunction with the timing circuitry 34. The dot pattern stored in register 72 is then shifted parallel into the printer buffer register 76 from which it is then serially transferred to a helix scanner 78 and displayed on the paper itself.

The printer buffer register 76 receives the serial output from the printer shift register and contains information which will provide to the helix scanner 78 a continuous flow of electrical charges in which to place the dots on the paper. The size of the printer buffer register is such that there is enough continuous information being provided to the paper so that there is no interruptions.

The continuous flow of information to helix 78 is provided much in the same manner as the information is continuously provided to and from UAR/T 16. Thus, in UAR/T 16 the information is transferred between an exchange buffer and a storage buffer in parallel but between the host computer and the exchange buffer of the UAR/T 16 the data is shifted in series. The exchange buffer is known to be emptied based on the baud rate. When the buffer is empty, a signal is generated which shifts in parallel more data into the exchange buffer and the newly emptied storage buffer generates a request flag to the flag testing logic 18. When the data is exchanged from the host computer 12 to the UAR/T 16 the request flag is generated during the shifting of the data from the exchange buffer to the storage buffer.

In like manner when the data is shifted in parallel to the printer buffer register 76, the printer shift register 72 becomes available for the next set of character dots. This transfer of data then enables a printer request signal 70 and subsequently a PC flag which is a request for more data.

The printer buffer register 76 shifts its information out serially to helix 78. When the buffer has been emptied, which is mechanically determined by the rotation of the helix scanner, then a signal is provided which shifts the contents of the printer shift register 72 in parallel into the printer shift register 76 and the next cycle is initiated.

It should be noted that the printer transfers characters onto the paper in a similar manner as the video display paints characters on the screen but at a much slower rate.

As was the case for the video display, there are required seven slices in order to generate the $5 \times 7$ character comprising the complete line for the printer, and hence, the accumulator, when one scan is completed, is incremented as was done for the video display 50.

This process of operation continues until the entire line to be printed on the helix scanner 78 has been completed. At this time, the helix scanner is disabled unless a request for an additional line has been identified as requiring a hard copy output.

While the other occurrences within the video terminal 10 are being serviced by the microprocessor, the scan for the video display 50 continues. Accumulator 26 has its contents in eased for each horizontal scan. When the count in accumulator 26 reaches 19, i.e. the 11 lines for interlinear spacing have been completed, the microprocessor enters into another series of operations which enables the electronic gun from the video display 50 to paint the next line of alphanumeric characters on the screen 62. This operation is the same as was described previously with the RAM 24 providing the necessary information to identify the next line to be displayed.

One of the most significant advantages of the above described video terminal is the ability to serve as an intermediate storage facility between the host computer and the output devices. The video terminal 10 requires all the above features to act as a stand-alone device but these features are also important in relieving the host computer of the time and transfer constraints previously required. Thus, the RAM 24 which stores the characters for the video display and printer receives the data only once from the host computer. Not only is individualized servicing of the video display and printer by the host computer obviated, but also transferring of data from either device is simplified since the same information is used and accessible for each device. More importantly, however, by acting as a local memory to the computer, the devices can be serviced more quickly since there is no need to transfer characters to either device one at a time; rather the devices are each serviced by the local memory via the microprocessor at the rate that each device requires. This results since control of the device is transferred from an on the computer to an off-line video terminal and the local memory of the video terminal is designed to service the timing relationship of the video display and printer.

In addition, by being an intermediate device in the transaction, the RAM 24 serves as a mass high speed buffer for the printer in contrast to the single character transfers previously required. As a result, the information needed by the printer can be transferred in a very small period of time to the local RAM of the video terminal and the time to do the printing remains constant. This results in considerable time and transfer efficiency for the output device vis-a-vis the host computer.

Obviously many changes and enhancements from the preferred embodiment may be utilized. Thus, they may be different character generators utilized which provide 4×6, 6×9 matrixs, etc. In addition, there may be several video displays connected in parallel which provide the same output to different remote locations as the case may be. In addition, several printers may be connected in parallel in order to provide multiple copies of the same output. However, the basic concept of utilizing the same character generator output for a raster cathode ray tube as well as a hard copy printer will be common to each application. Moreover, the use of other intermediate steps in order to provide the same features as disclosed herein will be readily apparent to those of ordinary skill in the art. For example, the sequence of transferring the information to the printer may occur in the time span which occurs between the generation of the last character in an intermediate slice of the line and the generation of the first slice for the next line. This time period may be utilized for servicing a printer request signal in which to send the information to the printer shift register 72. Moreover, other uses will become apparent to those of ordinary skill in the art. Therefore, it is desired to be limited only as provided by the claims hereinafter recited.

We claim:

1. In a video terminal system having at least two display devices, one of said display devices displaying data at a rate approximately two orders of magnitude faster than the other display device, said video terminal system having a microprocessor executing instructions controlling transfers in said system, the process of providing data to each of said display devices comprising the steps of:
  A. Storing, in a first part of memory, data to be displayed on said one display device;
  B. counting in an accumulator the scans across said one display device, each display line on said one display device comprising a first predetermined number of scans, each display line being separated by a second predetermined number of scans;
  C. sensing by test logic the count in said accumulator to determine when said first predetermined number of scans is occurring;
  D. addressing by address logic said first part of memory for data to be displayed by said one display device;
  E. transferring during said first predetermined number of scans from said first part of memory through a character generator to said one display device a dot pattern of said addressed data;
  E. displaying on said one display device said dot pattern for a display line during said first predetermined number of scans;
  G. identifying by a key switch on a keyboard one of said display lines to be displayed on said other display device;
  H. storing, in a second part of memory, address information which identifies data in said first part of memory to be displayed by said other display device;
  I. addressing by said address information during said second predetermined number of scans said first part of memory for data to be displayed by said other display device;
  J. transferring during said second predetermined number of scans said addressed data from said first part of memory through said character generator to said other display device a dot pattern of said addressed data;
  K. repeating steps H through J until said display line of data has been displayed on said other display device; and
  L. terminating steps H through K when said selected line has been displayed by said other display device.

2. The process as defined in claim 1 wherein said storing in said first part of memory step includes:
  A. testing by said test logic whether said keyboard has depressed key switch;
  B. transferring data corresponding to said depressed key switch to said first part of memory;
  C. testing by said test logic whether a UAR/T has received data; and
  D. transferring from said UAR/T to said first part of memory said data.

3. The process as defined in claim 1 wherein said addressing step includes:
  A. loading an X and Y register with an address identifying a memory location in said first part of memory;
  B. transferring the data in said memory location to said character generator, said character generator translating said data into said dot pattern; and
  C. transferring from said character generator to a shift register a slice of said dot pattern as determined by the count in said accumulator.

4. The process as defined in claim 3 and further including the steps of:
  A. storing in response to a load signal during said first predetermined number of scans in a video shift register said slice of said dot pattern; and
  B. serially transferring in response to shift signals said slice of said dot pattern to a video monitor.

5. The process as defined in claim 3 and further including steps of:
  A. storing in response to a load signal during said second predetermined number of scans in a printer shift register said slice of said dot pattern; and
  B. transferring said slice of said dot pattern to a printer buffer register.

* * * * *